US008386912B2

(12) United States Patent
Story et al.

(10) Patent No.: US 8,386,912 B2
(45) Date of Patent: Feb. 26, 2013

(54) HYPERMEDIA DOCUMENT PUBLISHING INCLUDING HYPERMEDIA DOCUMENT PARSING

(75) Inventors: Robert David Story, Sunnyvale, CA (US); Adam B. Feder, Mountain View, CA (US); Ed Burns, San Francisco, CA (US); Richard D. Lee, San Francisco, CA (US)

(73) Assignee: CA, Inc., Islandia, NY (US)

( * ) Notice: Subject to any disclaimer, the term of this patent is extended or adjusted under 35 U.S.C. 154(b) by 1034 days.

(21) Appl. No.: 08/901,069

(22) Filed: Jul. 28, 1997

(65) Prior Publication Data

US 2002/0129058 A1    Sep. 12, 2002

(51) Int. Cl.
*G06F 17/00* (2006.01)
(52) U.S. Cl. ....................................... 715/205
(58) Field of Classification Search ............... 715/501.1, 715/511, 513–514, 205–208, 229, 234
See application file for complete search history.

(56) References Cited

U.S. PATENT DOCUMENTS

| 4,833,604 | A | * | 5/1989 | Cheng et al. ................. 707/200 |
|---|---|---|---|---|
| 5,129,052 | A | * | 7/1992 | Barker et al. ................. 707/514 |
| 5,634,062 | A | * | 5/1997 | Shimizu et al. .............. 345/356 |
| 5,748,187 | A | * | 5/1998 | Kim et al. ..................... 715/201 |
| 5,787,424 | A | * | 7/1998 | Hill et al. .......................... 707/6 |
| 5,793,966 | A | * | 8/1998 | Amstein et al. .............. 709/203 |
| 5,832,494 | A | * | 11/1998 | Egger et al. ................ 707/1.02 |
| 5,848,415 | A | * | 12/1998 | Guck .............................. 707/10 |
| 5,860,071 | A | * | 1/1999 | Ball et al. ........................ 707/10 |
| 5,884,014 | A | * | 3/1999 | Huttenlocher et al. ...... 358/1.15 |
| 5,890,171 | A | * | 3/1999 | Blumer et al. ................. 707/501 |
| 5,892,908 | A | * | 4/1999 | Hughes et al. ................. 709/250 |
| 5,911,145 | A | * | 6/1999 | Arora et al. .................... 707/514 |
| 5,911,776 | A | * | 6/1999 | Guck .............................. 709/217 |
| 5,943,679 | A | * | 8/1999 | Niles et al. ..................... 707/526 |
| 5,958,008 | A | * | 9/1999 | Pogrebisky et al. .......... 709/223 |
| 5,983,351 | A | * | 11/1999 | Glogau .......................... 713/201 |
| 5,991,306 | A | * | 11/1999 | Burns et al. .................... 370/429 |
| 5,991,782 | A | * | 11/1999 | Miyagawa et al. ........... 707/513 |
| 6,014,680 | A | * | 1/2000 | Sato et al. ...................... 707/513 |
| 6,023,715 | A | * | 2/2000 | Burkes et al. .................. 707/514 |
| 6,026,417 | A | * | 2/2000 | Ross et al. ..................... 707/517 |
| 6,031,914 | A | * | 2/2000 | Tewfik et al. .................... 380/54 |
| 6,035,330 | A | * | 3/2000 | Astiz et al. .................... 709/218 |
| 6,052,730 | A | * | 4/2000 | Felciano et al. .............. 709/225 |
| 6,144,962 | A | * | 11/2000 | Weinberg et al. ............... 707/10 |

OTHER PUBLICATIONS

Filtering of Multimedia Links, IBM TBD, vol. No. 36, Issue No. 9B, Sep. 1, 1993, p. 61-62.*
ForeFront WebWhacker 3.0, hereinafter Webwhacker, Windows 95/NT (chapters 1-4, 1996).*
'Getting Results with Microsoft Office 97', hereinafter Office, Microsoft, Apr. 1997, pp. 441-463.*

(Continued)

*Primary Examiner* — Chau Nguyen
(74) *Attorney, Agent, or Firm* — Baker Botts L.L.P.

(57) ABSTRACT

Hypermedia documents can be published using a computer system by recursively parsing a hypermedia document to identify at least one direct linked document and at least one nested linked document. The addresses for the hypermedia document, the direct linked document and the nested linked document are remapped and versions of the hypermedia document and the linked documents are stored in a directory at their remapped addresses. The directory then can be distributed to another location on a network. Alternatively, or in addition, the hypermedia document and a document linked to it can be processed (e.g., converted to standard formats) based on predefined criteria before versions of the documents are stored in the directory.

37 Claims, 13 Drawing Sheets

OTHER PUBLICATIONS

Butler, "How to create and post your own personal Supernet Home Page", Supernet, The Frankentech Company, 1995, http://www.supernet.net/frankentech/how.htm, 2 pages.

"Publishing documentation pages for Webmagic", file:///Cl/Personal/temp.htm, 3 pages, Feb. 7, 1997.

"Publishing Scenes", file:///Cl/Personal/wsa/WebSpaceAuthor/tut.html, 2 pages, Mar. 11, 1998.

WebMagic User's Guide, "Overview of WebMagic", Silicon Graphics, Inc., 1997, hhtp://techpubs.sgi.com/library/dy..._UG/@Generic_BookTextView/32;td=2, 1 page, p. 14.

WebMagic User's Guide, "Publishing a Document on the Web", Silicon Graphics, Inc., 1997, http://techpubs.sgi.com/library/dy...G/@Generic_BookTextView/3755;td=2, 4 pages, p. 1-2.

WebMagic User's Guide, "Creating and Publishing Files Using the public_html Directory", Silicon Graphics, Inc., 1997, http://techpubs.sgi.com/library/dy...get%25N%13_161_START_RESTART_N25%, 2 pages.

WebMagic User's Guide, "Setting Publishing Preferences", Silicon Graphics, Inc., 1997, http://techpubs.sgi.com/library/dy...et=25N%14_4194_START_RESTART_N%25, 2 pages.

* cited by examiner

```
<!DOCTYPE HTML PUBLIC "-//W3C/DTD HTML 3.2//EN">

<HTML>

<HEAD>
  <TITLE>Welcome to Silicon Surf</TITLE>
</HEAD>

<!-------------------------------------------------------------
-------------->

<BODY BGCOLOR="#ffffff" TEXT="#000000" LINK="#004060" VLINK="#9a6524"
   ALINK="#00ffff">

<TABLE WIDTH="600" CELLSPACING="0" CELLPADDING="0">
<TR>
  <TD WIDTH="90">
    <A HREF="/Images/hp_discrete.map"><IMG ALT="[Navigation]" ISMA
P BORDER="0" SRC="/Images/hp_discrete.jpg" WIDTH="88"
HEIGHT="100"></A>
  </TD>
  <TD WIDTH="510">
    <IMG BORDER="0" ALT="Silicon Surf: The Corporate Website for S
ilicon Graphics Computer Systems"
SRC="/Images/hp_banner.jpg" WIDTH = "412" HEIGHT = "110" >
  </TD>
</TR>
</TABLE>

<TABLE WIDTH="600" CELLSPACING="0" CELLPADDING="0">
<TR>
  <TD WIDTH="430">
    <BR>
  </TD>
  <TD WIDTH="170">
    <A HREF="ss.home.page.html"><IMG BORDER="0"
ALT="Java" SRC="/Images/selector-java.gif" WIDTH = "72"
HEIGHT = "15" ></A><A HREF="hp_text.html"><IMG BORDER="0"
ALT="Text Only" SRC="/Images/selector-text.gif" WIDTH = "87"
HEIGHT = "15" ></A>
  </TD>
</TR>
<TR>
```

Fig. 1

HYPERMEDIA DOCUMENT PUBLISHING INCLUDING HYPERMEDIA DOCUMENT PARSING

BACKGROUND

This invention relates to publishing a hypermedia document.

A hypermedia document is a digital document that may have one or more references, or "links," to other documents or to other locations within the same document. A hypermedia document alternatively may have no links but rather may be a standalone document formed of one or more different media types (text, images, sounds, etc.). In either case, a hypermedia document can be made accessible over a network such as the World Wide Web (web) by "publishing" it to a web server. Publishing generally refers to the process of manipulating one or several hypermedia documents into an appropriate form and placing them at an appropriate location within a network so that they can be accessed by other users. Hypermedia documents generally are part of a collection of cross-referenced documents accessible over a network. Using a web browser, a viewer can use a document's links to move from one document to another, or to view the content of a linked document referenced in another.

Examples of different types of hypermedia documents include document types typically associated with the web—e.g., HTML (hypertext-markup language) and VRML (virtual reality modelling language) documents—as well as document types such as Quark XPress documents which have applications independent of the web. FIG. 1 shows a portion of a HTML document. Such documents can be created using various types of content development environments, including word-processing applications and authoring tools, which allow an author to create a HTML document without having to understand the complexities of the HTML language.

A published HTML document typically is accessible at a unique uniform resource locator (URL) address on a network server. When a viewer accesses the URL address of the document over the web, the HTML document is displayed as a web page. The HTML document shown in FIG. 1 is stored at the URL address http://www.sgi.com/ss.home.page.html As shown in FIG. 2, when a user points a browser at the document's URL address 21, the document is displayed as a web page 20 for Silicon Graphics, Inc. of Mountain View, Calif.

A hypermedia document typically includes both "linked" content (content that does not reside within the document under consideration but which is accessible indirectly from that document via visually indicated links) and content that is displayed directly within a hypermedia document rather than simply being linked to it. A document's content can include several different types of media, including text, images, sound, video documents, 3D virtual worlds, applets (self-contained executable programs written in computer languages such as Java or Java Script), or virtually any other media type provided a corresponding plug-in (an extension mechanism for handling non-standard data types) is available to be installed on a user's browser.

Each link within a hypermedia document corresponds to a URL address associated with the linked content. In some cases, a linked document is displayed automatically within the hypermedia document. For example, the Silicon Graphics logo 22 in the upper portion of FIG. 2 is a linked image document that is displayed automatically when the HTML document of FIG. 1 is displayed. In other cases, a linked document may be displayed as a text string with distinct formatting, and the document is not accessed until a viewer clicks, or otherwise selects, the displayed link. For example, "company info & jobs" 23 (in the upper right portion of FIG. 1) is a displayed link, and when selected by a viewer, the browser accesses and displays the linked document shown in FIG. 3.

A hypermedia document may reference various types of documents at "remote" or "local" URL addresses. A URL is regarded as "local" if it resides on the same server as the document that references it, and "remote" if the URL is on a different server than the referencing document. Whether local or remote, each linked document may include nested links to other documents, either local, remote or a combination thereof. In a nested group of documents, a top level hypermedia document includes a link to another document, which in turn includes a link to yet another document, and so on, to virtually any level of nesting. The hypermedia document and its "directly" linked documents (i.e., URLs that can be accessed by a single, direct jump from the referencing document), as well as its "nested" linked documents (i.e., URLs that can be accessed indirectly by two or more jumps from the referencing document) can be represented as nodes in a directed graph. A link between documents can be represented as a parent-child relationship between nodes. In such a representation, the initial hypermedia document (such as the document corresponding to FIGS. 1 and 2) is the top level document and its linked documents are sublevel documents.

Considerable effort may be required in publishing a hypermedia document. For example, publishing generally requires an author to verify that the URLs of the directly linked documents represent valid addresses. Otherwise, a user clicking a link with an invalid address would be presented with an error message such as "URL not found." To further increase the reliability of the hypermedia document, authors frequently also attempt to verify the addresses of the nested links. However, because nested links are at least two jumps removed from the referencing document, the mere act of identifying nested linked documents can be a painstaking process. Depending on the number of nested links that are identified, attempting to identify and verify all of the nested links can become a complex and expensive process and, potentially, an administratively unmanageable undertaking.

Further complicating the publishing process is the fact that commercially available browsers typically support only a limited subset of the universe of file formats available for the different types of media. For example, a typical browser may support only JPEG and GIF for images, WAV for sounds, MPEG-1 for movies, and VRML for 3D worlds. Thus, to ensure that linked documents are in supported formats, an author frequently must determine which formats are acceptable, create appropriately converted versions of the content in those acceptable formats, and adjust URL addresses as needed to point to the proper location of top level and sublevel documents.

SUMMARY

The hypermedia document publishing system described here can take one or more top-level hypermedia documents in any recognized hypermedia format (e.g., HTML or VRML), regardless of the environment in which the documents were authored, and systematically discover the linkage structure (the logical organization through which a collection of documents refer to one another) between the top-level document and the sub-level documents that make up, or are linked to, the top-level document. Based on the discovered linkage structure, the sub-level documents are collected, or gathered, into a directory. The resultant directory represents a package of documents which can be distributed or copied to another location, for example, to a server on a network.

As they are being collected into the package directory, the documents may have been renamed, and optionally may have been optimized, stripped of designated information, compressed, and/or converted to different formats, for example, from a non-standard format to a web-publishable format.

Among other properties, the resultant package contains the same effective content and relative linkage structure between documents as the original set of documents. The package, which can employ either a flat or a hierarchical storage structure, can be distributed as a unit between machines or physical locations without affecting the package's effective content or linkage structure. Typically, the package is distributed to one or more web servers to be served to browsers.

Certain implementations may include one or more of the following features.

Hypermedia documents can be published using a computer system by recursively parsing a hypermedia document to identify one or more direct linked documents and one or more nested linked documents. The addresses for the hypermedia document, the direct linked documents and the nested linked documents are remapped and versions of the hypermedia document and the linked documents are stored in a directory at their remapped addresses. The directory then can be distributed to another location on the network. Alternatively, or in addition, the hypermedia document and a document linked to it can be processed (e.g., optimized, compiled, compressed, converted to standard formats or otherwise reformatted) based on predefined criteria before versions of the documents are stored in the directory. The processing can reduce the amount of data in the documents while maintaining the same effective content. Moreover, information such as a digital watermark or other intellectual property protection mechanisms can be added to a document without altering the document's effective content.

The recursive parsing performed on the hypermedia document and its linked documents may include first parsing the hypermedia document to identify direct linked documents and then parsing the direct linked document to identify nested linked documents. The recursive parsing may terminate when a termination criterion is met, for example, when a discovered document is publicly maintained, when a referenced document has been identified as a "trusted" document, or generally upon detection of an element of the set of documents that is not to be stored in the directory.

For each document discovered, a version of the document may be stored selectively. Versions of documents may be stored either in a flat organization or in a hierarchical organization. Moreover, versions of the documents may be stored in accordance with a set of preferences, which, for example, were received from a user of the computer system. The set of preferences may include items such as a preference for reformatting documents prior to storing a version of the document in the directory. A preference also may describe an organizational structure (e.g., flat or hierarchical) with which the versions of the hypermedia document and linked documents are to be stored in the directory. The organizational structural preference also may include a custom mapping that defines storage addresses in the directory for versions of the hypermedia document, the linked documents or both. Other preferences may include a preference describing filenames of the versions of the hypermedia document and linked documents stored in the directory. Still other preferences may define a set of one or more documents not to be stored in the directory, for example, a document that is to be excluded from the remapping and storing operations.

The versions of the documents stored in the directory may tested for accuracy and coherence, for example, by simulating a server environment to preview the versions of the documents stored in the directory. If the author is confident that the versions of the documents stored in the directory are complete and correct, the directory can be distributed to a server on a network.

Users can edit one or more of the documents, versions of which already have been stored in the directory. In that case, the version of the document previously stored in the directory is selectively replaced with an updated version of the edited document, for example, by repeating the remapping (or processing) and storing operations. The remaining, unedited document versions in the directory are left undisturbed. This sequence of editing and selective replacing can be repeated an arbitrary number of times to effect incremental changes in the stored version of the edited document.

Either a single hypermedia document or several hypermedia documents can be parsed to identify their underlying linkage structure and to store versions of the identified documents in a directory. These parsing and storing operations, as well as the remapping or processing operations, can be performed in multiple passes or can be completed in a single pass.

Advantages may include one or more of the following.

Authors are freed from having to carefully manage and track the files in their creative environment and from having to constrain the storage structure (i.e., a directory containing a hypermedia document and its subcomponents) of their creative environments to match a future publication site's structure. Moreover, authors no longer need to fix and manually verify the preservation of a document's linkage structure once the files are rearranged in the storage structure.

Authors also can be freed from having to use only web-publishable formats for files, having to know how to process (e.g., optimize, compress or convert) their documents and sub-documents to place them in a properly publishable form—the hypermedia document publishing system optionally can perform any or all of these processing tasks automatically.

The set of component applications used by the hypermedia document publishing system (e.g., file format parsers and converters) can be extended dynamically to allow new hypermedia file formats, or to improve on the existing applications.

More particularly, addresses of direct and nested links within a hypermedia document can be identified and verified automatically, regardless of the number of link nesting and regardless of the type or format of the documents involved, thereby relieving authors of the administrative burdens associated with performing these functions manually. Moreover, versions of top level and linked sublevel documents are created automatically in a "package"—a single working directory structure—thereby allowing cross-references between documents to be represented with relative, as opposed to absolute, addresses. Publishing can be completed by distributing the resulting package of documents to a web server.

Authors can select preferences that affect the format of documents in the package directory. Such preferences may, for example, automatically optimize, convert, compress, or compile documents in accordance with an author's specifications. The preference options may be updated as needed to accommodate new document types, changing standards and the like.

Other features and advantages will become apparent from the drawings, the following description and the claims.

DRAWING DESCRIPTIONS

FIG. 1 shows a HTML document.

DETAILED DESCRIPTION

Figure 2:
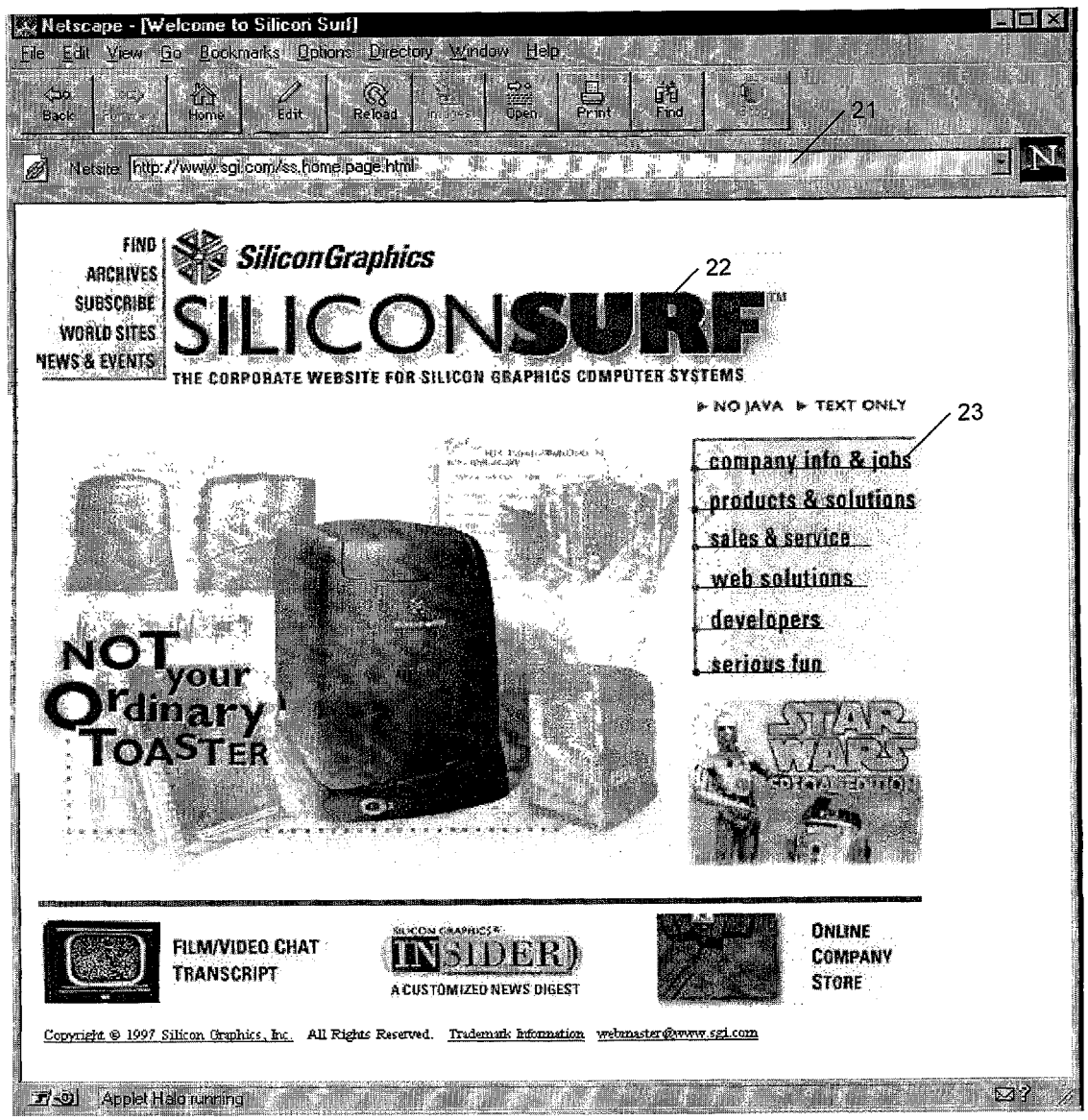
FIGS. 2 and 3 show a HTML document as viewed with a browser.
Figure 3:
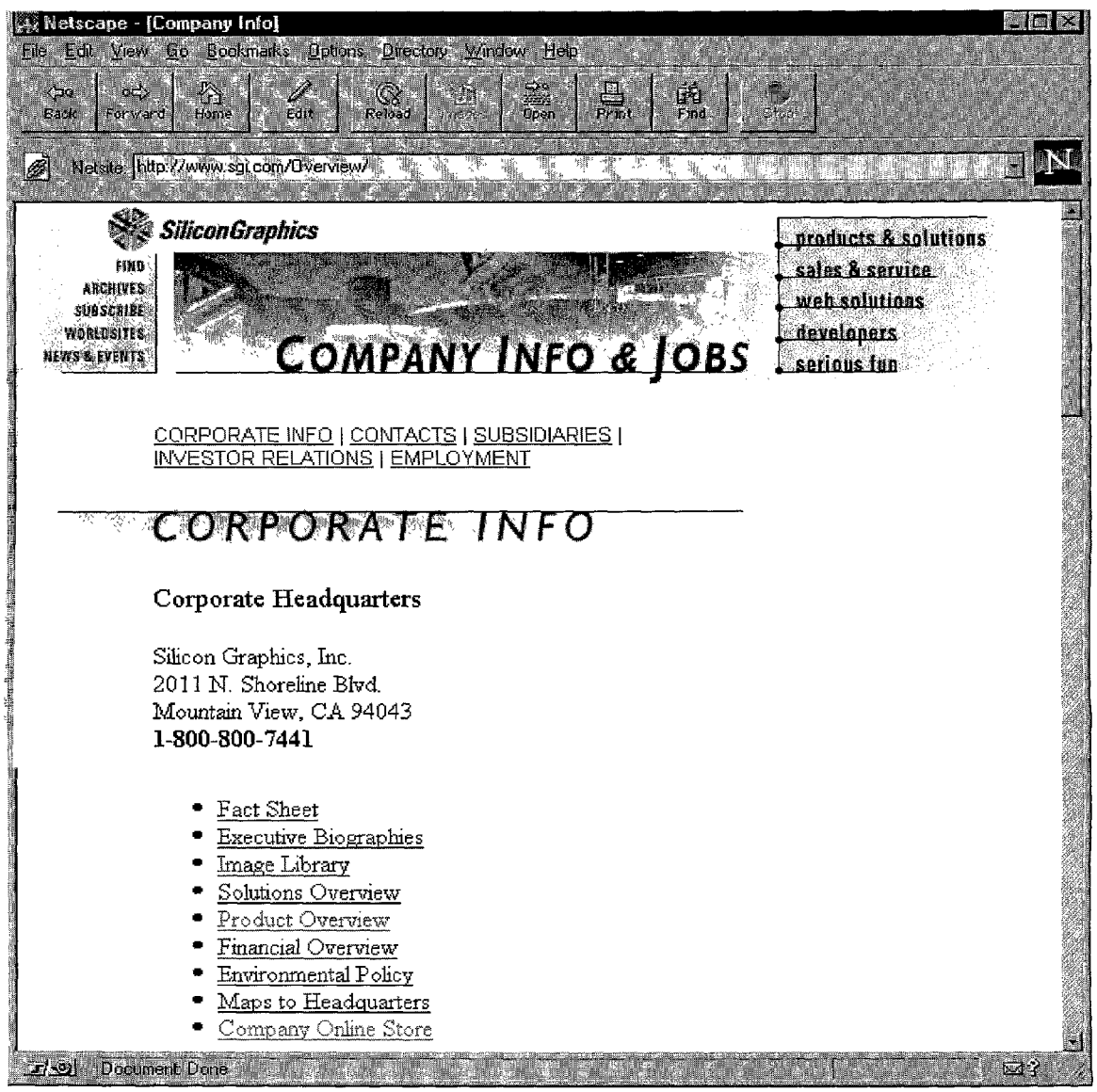
Figure 4:
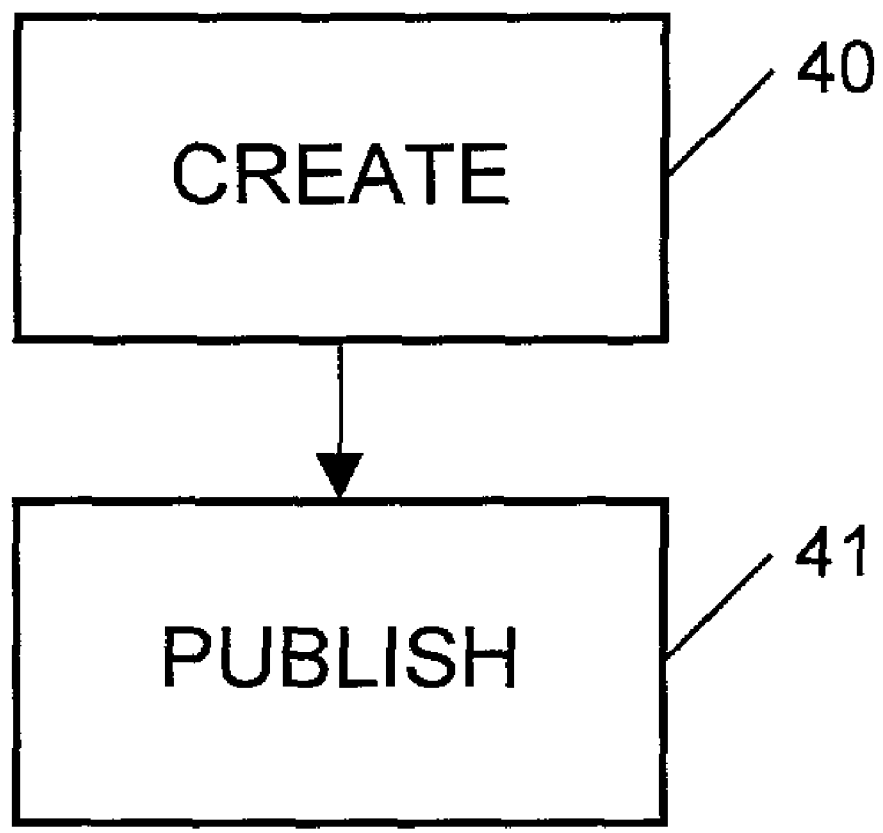
FIGS. 4 and 5 are flow diagrams for publishing a hypermedia document.

Referring to FIG. 4, making a hypermedia document accessible over a network involves two basic steps: creating a document (step 40) and publishing the document to a web server (step 41).

To create a hypermedia document, such as the HTML document illustrated in FIG. 1, an author may use any appropriate authoring application, such as a general purpose word processing application or a specific web authoring application, such as Cosmo™ Create or Cosmo™ Worlds, both of which are available from Silicon Graphics, Inc. of Mountain View, Calif.

Figure 5:
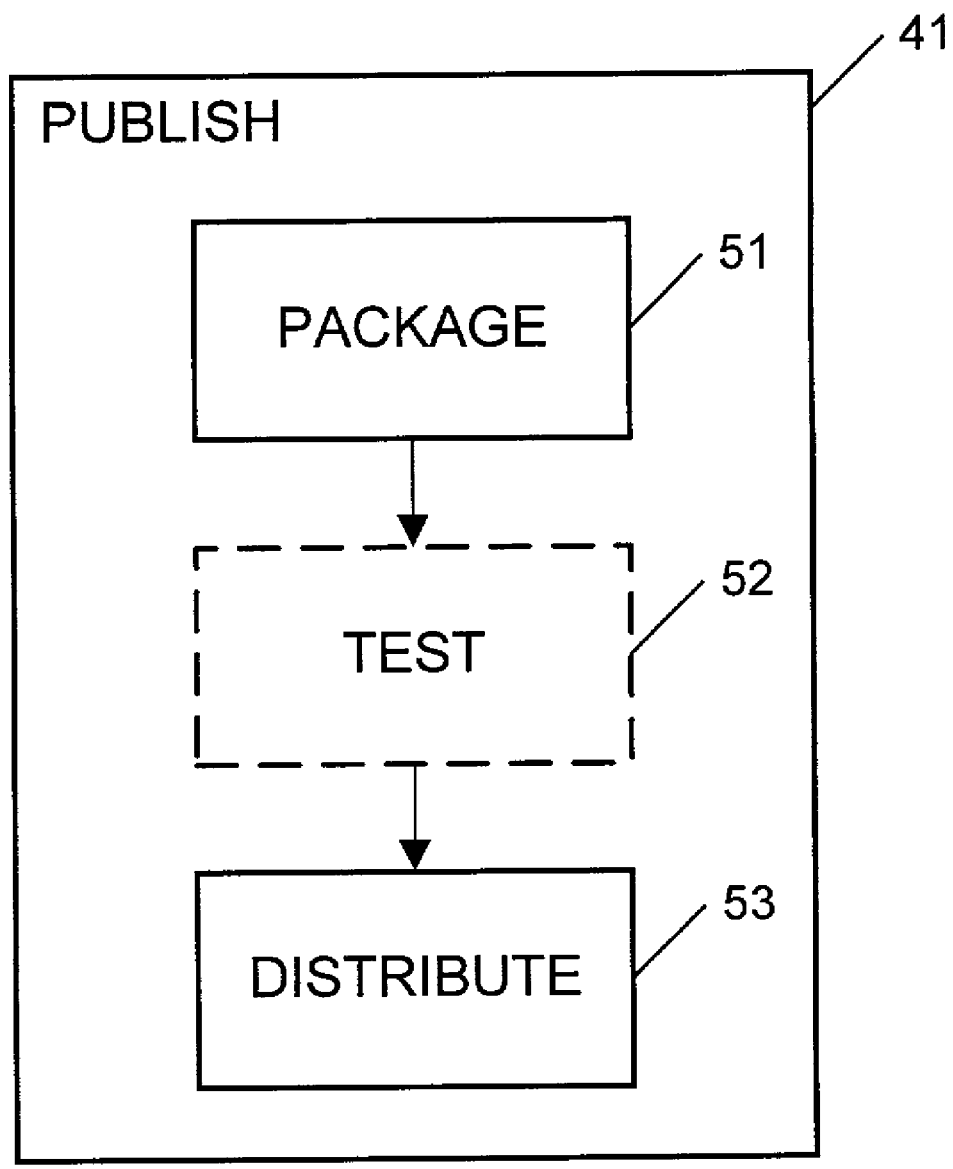

After one or more hypermedia documents have been created as desired, the documents are made available for network access by publishing them. Referring to FIG. 5, publishing 41 includes packaging the top level and sublevel linked documents (step 51), optionally testing the packaged documents (step 52), and distributing the packaged documents to a network server (step 53), where they can be accessed by other users over the network. The components of the publishing step 41 may be implemented through software, hardware, or a combination of both. For example, Cosmo™ Create and Cosmo∩ Worlds both include software which may be run on Silicon Graphics machines to publish hypermedia documents.

1. Packaging

As discussed above, a hypermedia document may contain multiple levels of nested documents. Identifying and verifying the addresses of the sublevel documents is a labor intensive task for an author to perform manually. The packaging step 51 automatically performs this task for the author.

In doing so, the packaging step 51 "discovers" the linkage structure of the directed graph corresponding to a top level document by identifying its sublevel linked documents, determining whether to "remap" discovered documents into a "stage" directory (described below), and determining the organization of those documents in the stage directory. The packaging step 51 then "collects" the documents to be remapped by creating versions of those documents at their remapped addresses. The result is a location-independent package of documents, which may be distributed to a server (step 53). If the server is on a network, distribution of the package can be effected via the network and, subsequently, users can use the network to access the packaged documents on the server. If the server is not on a network, for example, in a standalone configuration, the package can be copied to the server via modem, by means of a removable disk, or through any other suitable mechanism.

Figure 6:
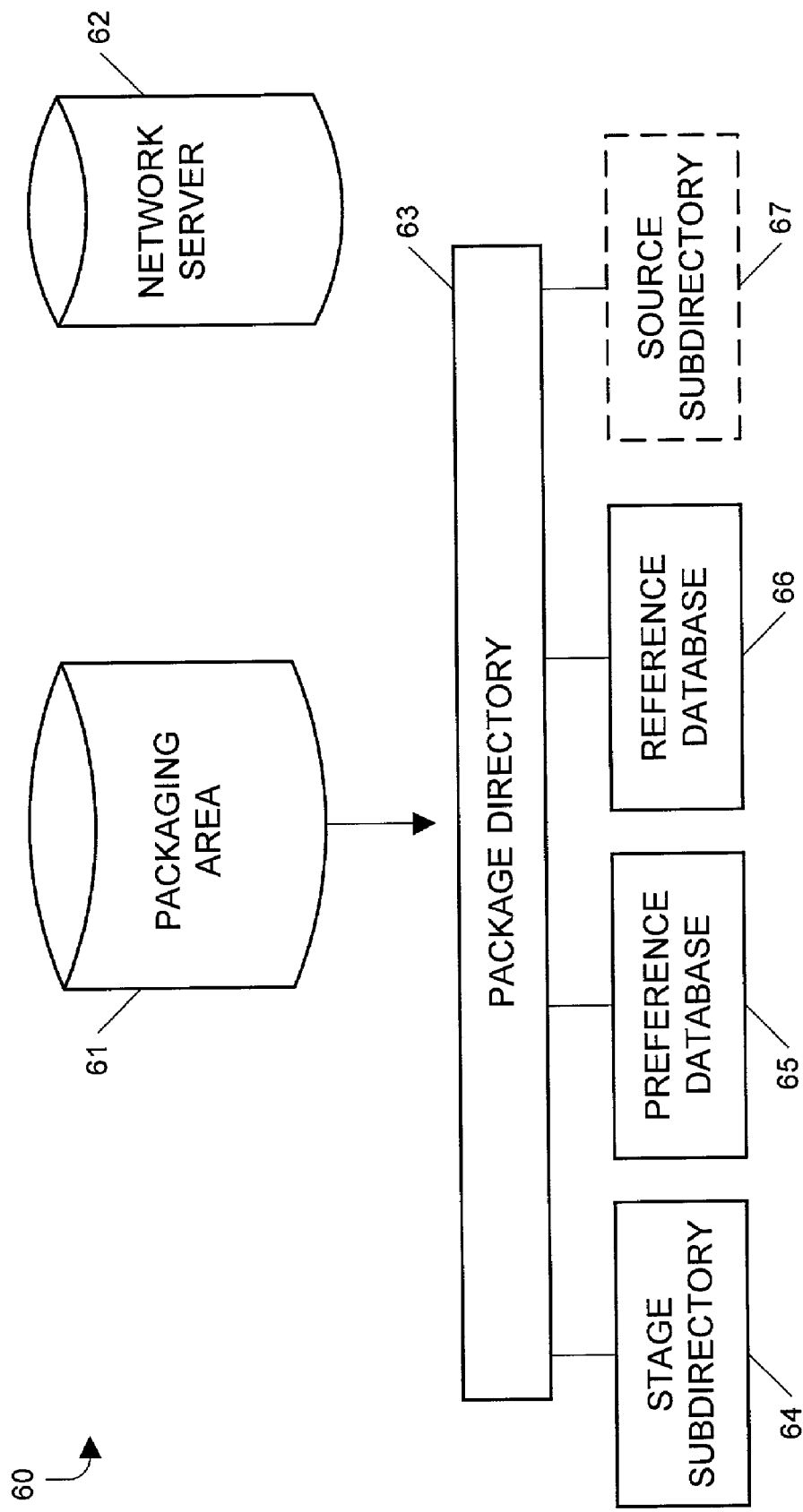
FIG. 6 shows a logical representation for publishing a hypermedia document.

FIG. 6 shows a logical representation of the storage area 60 used by the packaging step (step 51 in FIG. 5). The Packaging Area 61 is a storage area accessible to the author, and typically corresponds to memory space on the author's computer or local area network. Within the Packaging Area 61, a top level document is packaged within a directory, labeled in FIG. 6 as the Package Directory 63. The packaging step 51 remaps and collects documents into the Stage Subdirectory 64. When finalized, the contents of the Stage Subdirectory 64 are distributed to a network server (step 53 of FIG. 5), making the top level document accessible over the network.

Publishing 41 in FIGS. 4 and 5 begins with the author's selection of one or more top level documents to publish. A publishing application may present a graphical user interface (GUI) such as that illustrated in FIG. 7. When an author selects the Top Level Documents tab 70, top level hypermedia documents that already have been added to the package are listed in the window 71. The author may select one or more of the listed documents, or may select an unlisted document by selecting the Add button 78 and entering the name of the document. Alternatively, a browse option may be provided to allow the author to browse and select from accessible documents. As noted above, these top level documents may be created using any appropriate application such as a word processing or web authoring application.

The publishing application packages the selected top level document(s) and zero or more sublevel documents in a Package Directory 63 (FIG. 6), either a default directory or one designated by the author. For newly created package directories, the publishing application may assign names automatically, which the author can later modify.

a. Setting Preference Options

Figure 8:
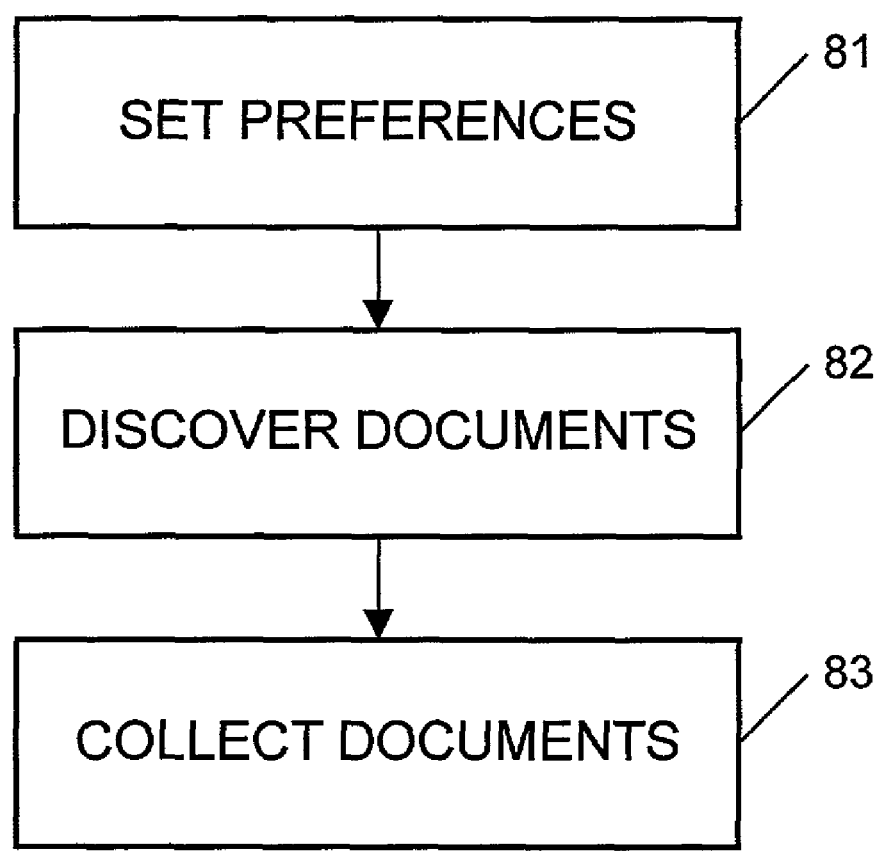
FIG. 8 shows a flow diagram for publishing a hypermedia document.

Referring to FIG. 8, the packaging step 51 optionally allows the author to set certain preferences (step 81) that will affect the format of the documents stored in the Stage Subdirectory 64. These preferences, which relate to standard mappings, custom mappings, trusted references, document-type-specific formatting and conversion properties, may be stored in a Preference Database 65 corresponding to the Package Directory 63. The range of available preferences may be extended as desired through the use of appropriate plug-ins.

Figure 9:
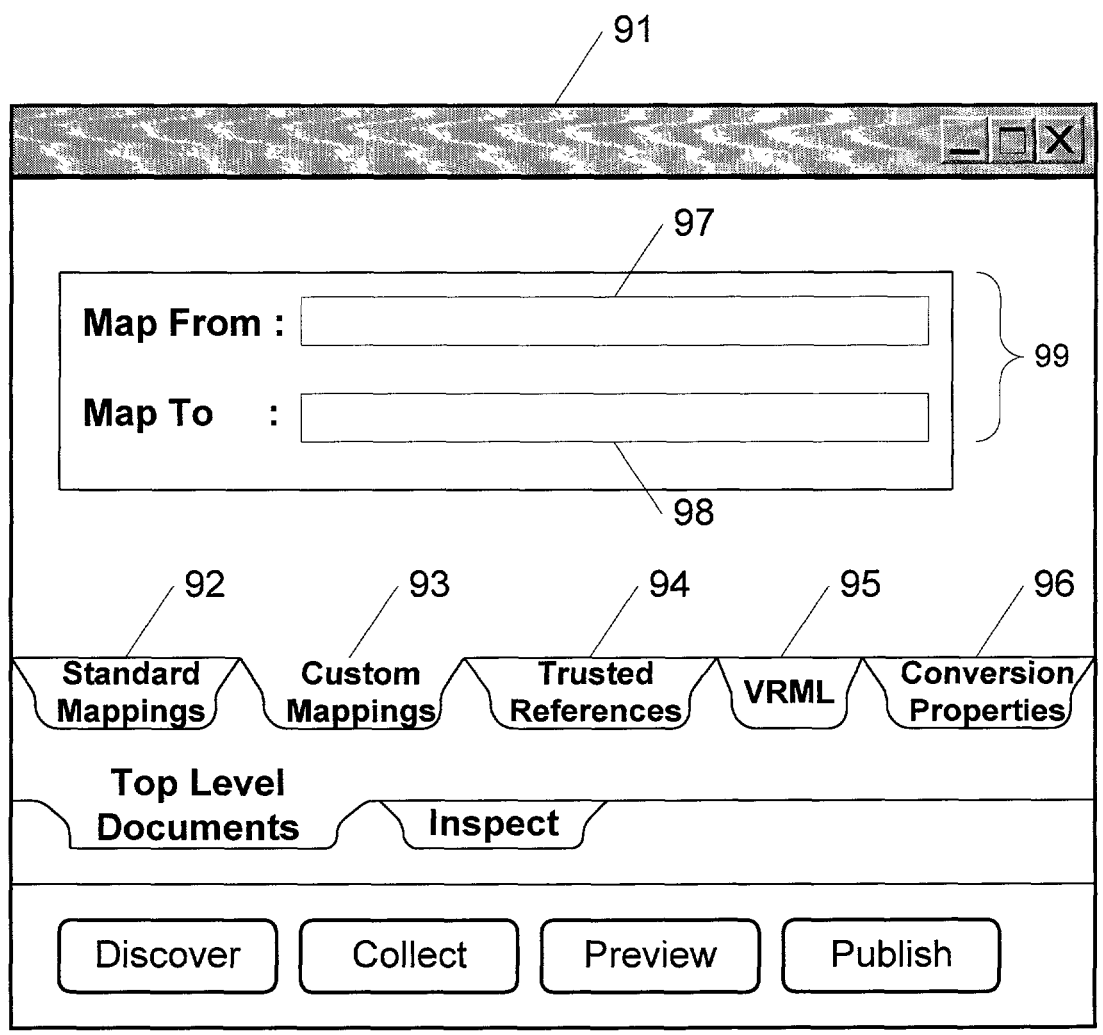
FIG. 9 shows a GUI used in publishing a hypermedia document.

Using a GUI such as that illustrated in FIG. 9, the author may select Preferences, which displays tabs (92, 93, 94, 95, 96) for a set of preferences.

One preference option allows the author to set a Standard Mapping 92, which affects the organizational structure with which the documents will be stored within the Stage Subdirectory 64. For example, the Standard Mapping 92 preference option may allow the author to select between a flat organization and a hierarchical organization. For two linked documents to be packaged—file:/usr/images/sun.gif and file:/usr/images/moon/full-moon.gif—a flat standard mapping will store the two documents at the same level in the Stage Subdirectory 64 as /stage/sun.gif and /stage/full-moon.gif. In contrast, when the user chooses to package the two documents based on a hierarchical standard mapping, the nested subdirectories /usr/, /usr/images/, and /usr/images/moon/ are created within the Stage Subdirectory 64 and the two files will be respectively stored as /stage/usr/images/sun.gif and /stage/usr/images/moon/full-moon.gif.

In general, default settings may be used for each preference option. For example, if the author does not specify a Standard Mapping, a default setting (either flat or hierarchical) will be applied. The default settings, which be changed by the author, are used by the publishing application until later modified.

Another preference option allows an author to specify one or more Custom Mappings 93, each of which defines a specific mapping from a source address of a document to a specified address in the Stage Subdirectory 64. FIG. 9 shows an example of a dialog box 99 that opens within window 91 when an author selects the Custom Mappings tab 93. For each custom mapping desired, an author enters a source address (or part thereof) in the Map From box 97 and a desired address in the Map To box 98. Users can specify virtually any number of custom mappings in this manner.

For example, an author can map all linked documents stored in source directory file:/usr/images/ to addresses in a subdirectory /images/ within the Stage Subdirectory 64 by specifying file:/usr/images as the Map From address 97 and /stage/images as the Map To address 98. An author also can map a single linked document from its source address to an address in the Stage Subdirectory 64 by entering the document's filename as well as its pathname. For example, an author may create a Custom Mapping from source address file:/usr/images/sun.gif to Stage Subdirectory 64 address /stage/images/sun.gif, which will map the document sun.gif as specified, but which will have no affect on the mappings of other documents from the same source directory file:/usr/images/.

Another preference option allows an author to specify a linked document as a Trusted Reference 94. As noted above, documents copied into the Stage Subdirectory 64 eventually may be distributed to a directory on a network server 62. In some cases, an author may be confident that a specific sub-level document exists already on the network server 62 and may wish that document to be referenced at its existing address on the network rather than creating a duplicate locally. For example, Silicon Graphics, Inc. may have multiple hypermedia documents published in directories on a specific network server at http://www.sgi.com/websites, and may have a logo directory on that server at http://www.sgi.com/websites/logos, which includes image documents corresponding to logos for its various products. So that the logos are used consistently in its hypermedia documents, the company may desire that each hypermedia document references the documents in the logo directory rather than referencing image documents stored at other addresses. In such a case, an author of a company hypermedia document that includes links to image documents for logos may specify linked documents at http://www.sgi.com/websites/logos as Trusted References. Not only does this practice ensure that shared documents are consistent, but it also saves space and reduces subsequent maintenance work, often to a substantial degree.

As with Custom Mappings, an author can designate a set of linked documents stored in the same source directory as Trusted References by designating an entire directory as "Trusted." In terms of the above example, the author can specify the directory /logos/ as a Trusted Reference, thereby designating all documents stored in the /logos/ directory as Trusted References. The author also can designate a specific linked document as a Trusted Reference by identifying it by filename. For example, the author can designate http://www.sgi.com/websites/logos/Cosmo_Create.gif as a Trusted Reference. Additionally, if the author knows the location on the network server where the root document and its linked documents will be published, the author can identify the Trusted Reference document(s) by a relative address. For example, if the author knows that the hypermedia document is to be stored in the directory http://www.sgi.com/websites/Cosmo_Create/, the directory http://www.sgi.com/websites/logos/ may be indicated in the documents as . . . /logos/. In which case, the author may choose to make . . . /logos/ a trusted reference.

The effects of designating a linked document as a Trusted Reference are explained further with reference to the Discover and Collect steps 82 and 83 of FIG. 8.

Preference options may also be provided for formatting documents. For example, an author may set preferences for formatting VRML documents 95 before they are copied into the Stage Subdirectory 64. Such preferences may include setting a degree of floating point precision, ensuring that filenames of VRML documents have a ".wrl" extension, and compressing VRML documents. Another VRML preference option may optimize use of texture documents in a single VRML document. For example, if the VRML document contains multiple references to a specific texture document, the optimization may create a single named object for the texture, and replace the references with instances of a single copy of the object. Optimizing in this manner can shorten download time greatly and can reduce memory usage on both the server and the client.

Other preference options relate to reducing the amount of data in documents. With respect to VRML documents, for example, preference options may be provided to allow an author to specify a reduced number of significant digits for floating point precision, or to strip authoring information from documents, such as comments in source code or other meta data. An author may use such options to prevent such data from being publicly disclosed.

Authors also may specify preferences that add information to documents but without affecting the effective content of the documents. For example, a preference may allow an author to specify a digital watermark (an electronic signature that protects a document's content without noticeably altering its effective content), or any other mechanism for protecting intellectual property rights in a document's content, which is to be inserted automatically in documents as they are being processed.

Preference options also may be provided for compiling source code. These preferences are used during packaging to compile a source code document automatically as it is being collected.

Many of the preference options effectively reduce the amount of data present in the documents while maintaining the same effective content. Data reduction is beneficial, among other reasons, because it reduces the amount of time required to transmit documents over a network.

Other formatting preferences allow an author to specify automatic Conversion Properties 96 such as preferred file formats for documents of specific media types. Web browsers typically support only a limited number of file formats. To ensure that a hypermedia document can be accessed by browsers that require specific formats, the publishing application allows the author to set conversion properties for converting documents of specified formats to other specified formats automatically before the documents are copied to the Stage Subdirectory 64. For example, an author may wish to convert all image files in RGB format to the more standard JPEG format.

Plug-in conversion applications may be installed for use by the publishing application to convert file formats as needed. For example, Silicon Graphics, Inc. provides imaging tools including conversion utilities, which may be installed for use by a publishing application. In addition to providing conversion in accordance with preference options set by an author, updated applications (converters, parsers and the like) may be added without requiring a re-release of the publishing application. Such updated applications may, for example, convert and/or parse file formats in a manner compatible with newly evolved standards or otherwise recognize and handle newly developed file formats.

In general, the specific preference options provided to the author may be varied for specific applications and may be implemented by providing additional software or hardware for use by the publishing application as needed.

b. Discovering Documents

Referring again to FIG. 8, after the optional preference setting step 81 is completed, the linkage structure for the graph corresponding to the top level document(s) is "discovered" (step 82) by analyzing each top level document and recursively analyzing direct and nested linked documents. The linkage structure describes the relationship between the top level and sublevel linked documents. For example, assuming Document A has been identified, the linkage structure provides information such as Document A's address, its parent documents (documents including a link to Document A), and its child documents (documents to which Document A includes a link). Using a GUI such as that illustrated in FIG. 7, the author initiates this step by selecting the Discover button 74.

Figure 10:
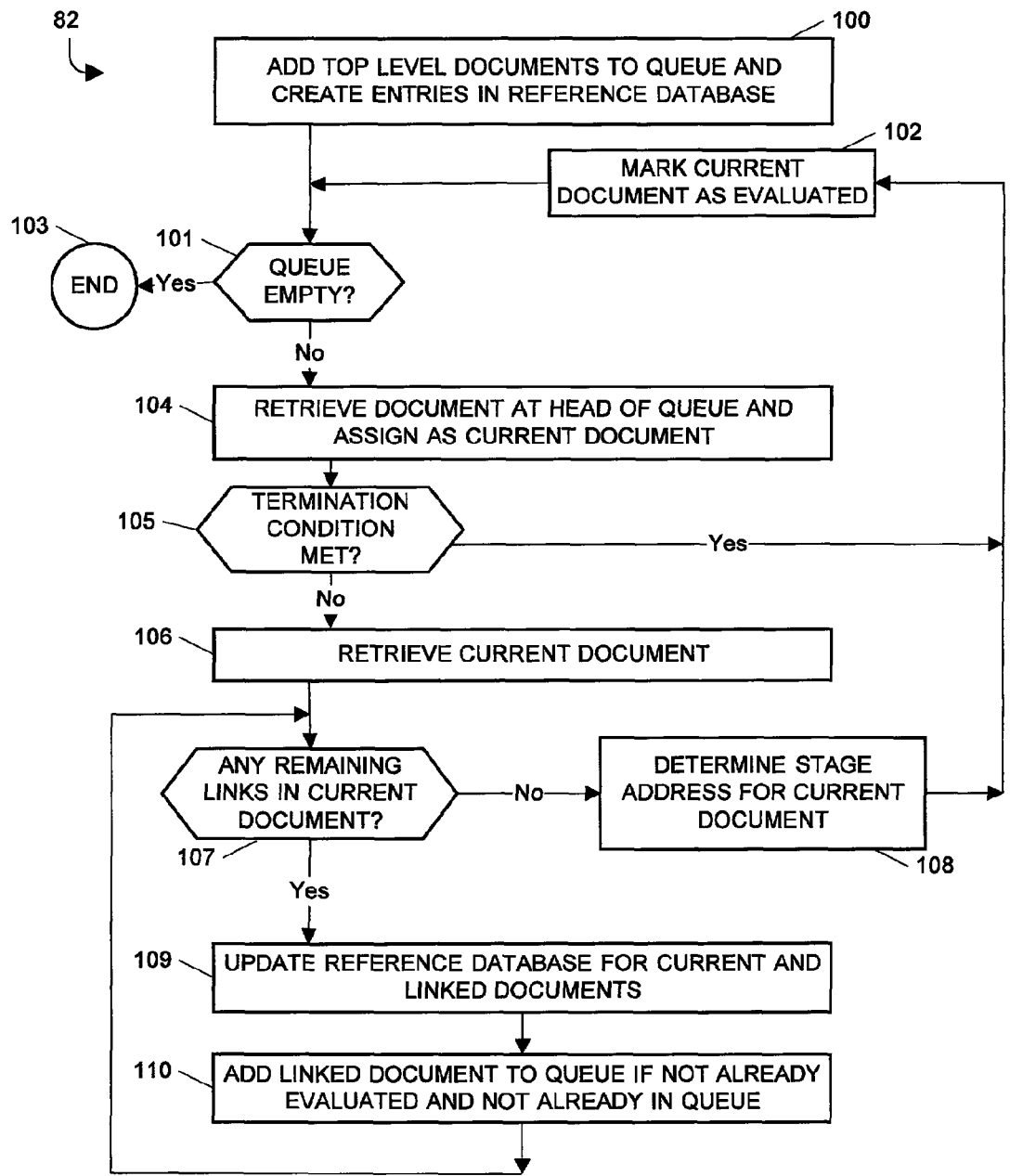
FIGS. 10 and 11 illustrate flow diagrams for publishing a hypermedia document.

One possible implementation of the Discover step 82, outlined in the flow diagram of FIG. 10, recursively evaluates documents and their linked documents, beginning with the top level documents. The Discover step 82 orders the documents in a Discover Queue, which is initially empty. When initiated, the publishing application adds the one or more top level documents to be published to the Discover Queue and creates entries for each top level document in a Reference Database (66 in FIG. 6) (step 100).

The Reference Database 66, which stores information about the top level and sublevel linked documents, is an example of a data structure that can be used to implement the linkage structure described above. For example, an entry in the Reference Database 66 for a document may include information such as the document's source address, stage address (the remapped address in the Stage Subdirectory 64), document type, applicable Preference Options, and information about the document's parent and child documents. When an Reference Database entry is created for a document initially, the entry data may include only the document's source address.

If the Discover Queue is empty (step 101), the Discover process ends (step 103). Otherwise, the document at the head of the Discover Queue is removed from the Queue and assigned as the Current Document (step 104).

The Discover step (step 82 in FIG. 8) recursively discovers linked documents within the Current Document until predefined termination criteria are met. Step 105 in FIG. 10 determines whether to discover the linked documents of the Current Document using termination criteria which may vary for different applications. The data stored in the Reference Database 66 are used to determine which documents should be remapped and stored in the Stage Subdirectory 64, for later distribution to a network server. Thus, the Discover step 82 may be implemented to prevent discovery of underlying documents that are linked to by a document which is designated as one that is not to be remapped, collected, and distributed.

In general, the termination criteria serve several different purposes. First, termination criteria prevent the publishing application from discovering an infinitely expanding universe of linked documents. Without such termination criteria, the discovering process could continue its operation indefinitely, or at least beyond a scope that is reasonably manageable by the publishing application.

Second, termination criteria prevent the publishing application from attempting to manipulate documents that are publicly maintained, and thus which should not be copied. For example, remote documents frequently are maintained by third parties and therefore should be referenced at their source addresses. Thus, the publishing application may be constrained to collect only locally stored sublevel documents, in which case the application may be configured to prevent the discovery of linked documents in remote documents (which are identifiable by their URL addresses).

Further, the termination criteria enable the discovering process to be terminated upon the occurrence or detection of a user-specified event or condition. For example, linked documents of a Current Document designated as "Trusted References" also may not be discovered. As described above, an author designates a document as a Trusted Reference to indicate confidence that the document will in fact exist on the network server where the hypermedia document will be published.

Other criteria for determining whether to discover linked documents of a Current Document may be provided as desired. If the Discover process determines that the Current Document should not be discovered, the document is marked as having been evaluated by the Discover process (step 102), which therefore is completed for the Current Document. The process returns to step 101 to determine whether other documents are present in the Discover Queue.

If the Discover process determines that linked documents of the Current Document should be discovered, the Current Document is retrieved from its source address in step 106. The Discover process next identifies the linked documents in the Current Document (step 107), typically by parsing the retrieved Current Document. Various parsing applications may be provided or installed as needed for parsing different document types.

The Discover step may not find any linked documents for a Current Document. For example, some types of documents, such as image documents, typically have no linked content. Similarly, the Current Document may be a hypermedia document having no links. Another possibility is that the Current Document may be of a type unrecognized by the Discover step. In that case, the publishing application may be unable to parse the document to determine its links.

More particularly, the Discover step may encounter documents of types that the publishing application is not equipped to handle. Certain document types (e.g., Java documents) may contain "rigid relationships" between components—that is, a linkage between documents whose relative storage structure either cannot be determined or which cannot be safely changed. For example, a URL for an image referred to by a Java applet typically will be embedded within the Java source code. Due to the complexities of parsing Java source code, the publishing application most likely will be not be able to identify the image's URL within the Java applet successfully.

Even assuming that the publishing application could identify the image's URL within the Java applet, attempting to remap the documents to new stage addresses could destroy a relationship that is vital to the applet's linkage structure. Accordingly, when a rigid relationship is identified, the publishing application should attempt where possible to maintain the parent document (e.g., the Java applet) and the child document (e.g., the image) in the same relative relationship. If the relationship cannot be maintained (e.g., the user has specified a mapping that contradicts the rigid relationship), the publishing application should signal an error to the user.

For a Current Document having linked documents, the Reference Database 66 is updated for each linked document identified (step 109). For example, if the linked document does not have an entry, the Discover process may create in the Reference Database 66 an entry including information such as the linked document's source address and an identification of the Current Document as a parent document. If an entry exists already in the Reference Database 66 for the linked document, the entry may be updated to indicate that the Current Document is a parent document. Additionally, the entry for the Current Document is updated to indicate that the linked document is a child document.

If the Reference Database 66 does not indicate that the linked document already has been evaluated by the Discover process and if the linked document is not already in the Discover Queue, the linked document is added to the end of the Discover Queue (step 110).

When all linked documents of the Current Document have been identified (step 107), a stage address in Stage Subdirectory 64 to which the Current Document will be copied is determined (step 108). Referring to the preference options set by the author and stored in the Preference Database 65, if the author set a Custom Mapping applicable to the Current Document, the stage address is determined based on the Custom Mapping. Otherwise, the stage address is determined according to the Standard Mapping. In a flat organization, each Current Document will be assigned an address at the top level of the Stage Subdirectory 64. For example, a Current Document having a source address of file:/usr/images/sun.gif may be assigned a stage address of /stage/sun.gif. In a hierarchical organization, a Current Document may be assigned an address in the Stage Subdirectory 64 that reflects the pathname in its source address. For example, a Current Document having a source address of file:/usr/images/sun.gif may be assigned a stage address /stage/usr/images/sun.gif in a subdirectory /stage/usr/images created within the Stage Subdirectory 64.

In some cases, two different documents may be mapped to the same stage address. For example, using a flat Standard Mapping, documents file:/usr/images/sun.gif and file:/mydocs/images/sun.gif may be mapped to the same stage address, specifically, /stage/sun.gif. The publishing application may be implemented to recognize this situation and to rename the files appropriately. For example, file:/usr/images/sun.gif may be mapped to /stage/sun.gif and file:/mydocs/images/sun.gif may be mapped to /stage/sun-2.gif.

The next step 102 in FIG. 10 updates the entry in the Reference Database 66 for the Current Document to reflect that the Current Document has been evaluated and the process returns to step 101.

When the Discover step ends (step 103), the results may be provided to the author. For example, a list of documents not found at their source addresses in step 106 may be created and displayed. Similarly, a list of documents for which no linked documents were found at step 107, because they were of an unrecognized document type, may be created and displayed. The result if the Discover step fails to find a document at step 106 may vary. For example, the application may return an error message and exit. Alternatively, the publishing application may interface with other application components to aid the author in providing correct addresses for the linked documents.

c. Collecting Documents

Referring to FIG. 5, the Package step 51 packages top level and sublevel linked documents in the Stage Subdirectory 64 such that the top level document(s) can be published by distributing the contents of the Stage Subdirectory 64 to a network server (step 53). Thus, as shown in FIG. 8, after the documents have been discovered (step 82), the collect step (step 83) collects versions of the documents in the Stage Subdirectory 64. Using a GUI such as that illustrated in FIG. 7, an author begins the Collecting step by selecting the Collect button 75.

Figure 11:
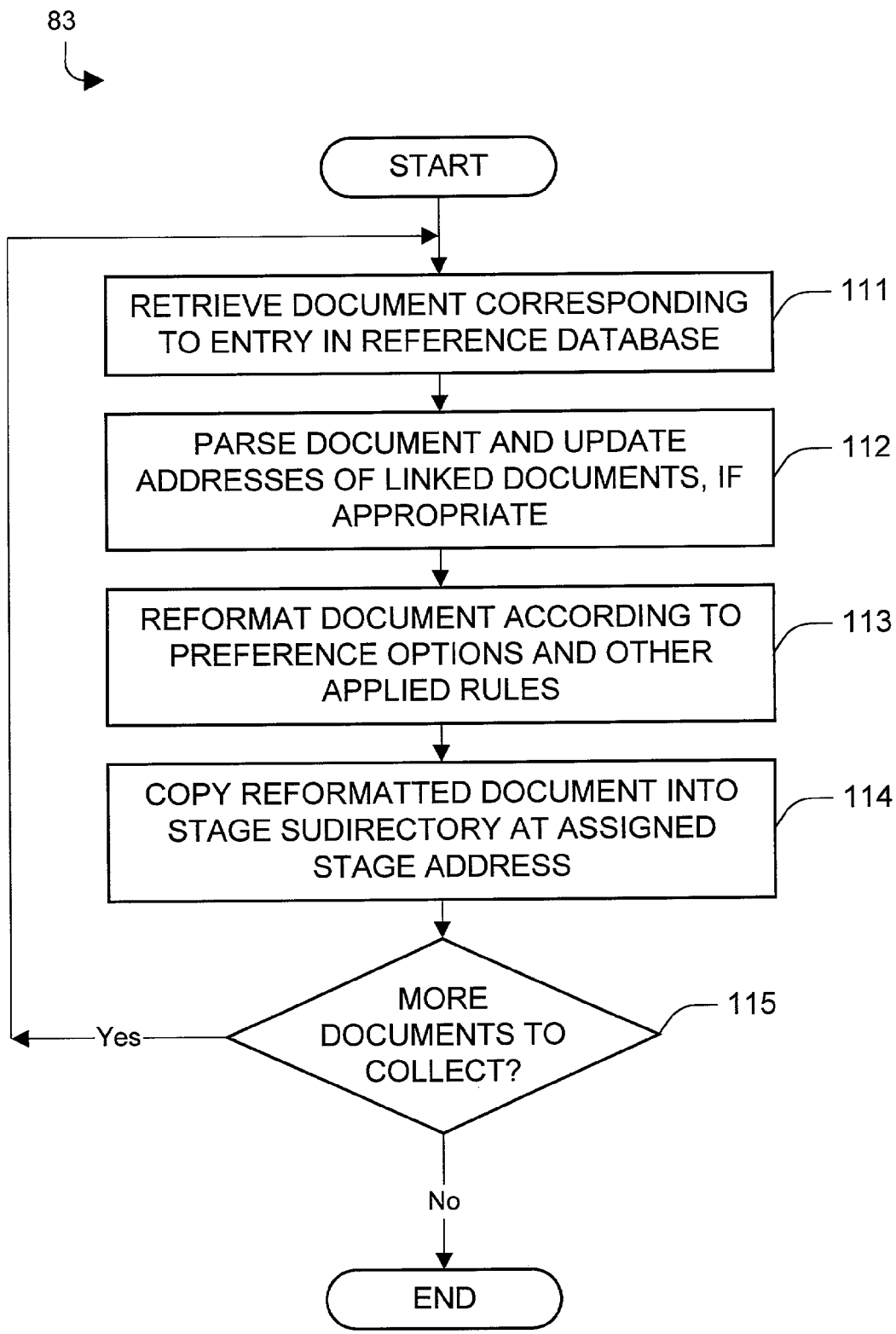

FIG. 11 is a flowchart of the process that occurs for each document to be collected into the stage directory. The Collect step is applied to each document in the Reference Database 66 for which a stage address was determined (step 108 in FIG. 10). Each such document is retrieved from its source address, processed (e.g., parsed, reformatted, remapped) and then written to a new location. The actual document residing at the source address is not altered—rather, a version of that document containing the same effective content is created and stored at its stage address.

More specifically, after a document is retrieved (step 111), the document is parsed and link addresses are updated as needed (step 112). For example, if document A includes a link to document B, the parsing step finds the link, finds the entry corresponding to the linked document B in the Reference Database 66, and determines whether to update the link address depending on whether a stage address has been assigned for the linked document B. If document B has not previously been assigned a stage address, the parsing step does not modify document B's link address. On the other hand, if document B has a stage address, the parsing step 112 will update the link address of document B to its stage address, relative to document A's stage address. For example, if document A has a stage address of /stage/sky.html and document B has a stage address of /stage/usr/images/sun.gif, the link address to document B in document A may be updated to usr/images/sun.gif.

The Collect step 83 in FIG. 8 also reformats retrieved documents in accordance with any preference options determined in step 81 (and stored in Preference Database 65) and other applicable rules (step 113 in FIG. 11). The Collect step 83 may be implemented to determine which preference options apply to a document, and to update the document's entry in the Reference Database 66 to reflect which preference options were applied.

For example, based on the applicable preference options, VRML documents may be modified to a specified degree of floating point precision, a ".wrl" extension may be added to filenames of those documents not already having that extension, VRML documents may be compressed, and referenced texture files may be optimized. Additional rules also can be applied automatically as needed to conform VRML documents to current VRML standards.

In addition, if the author specified that certain file formats were to be altered or converted to other specified file formats, the Collect step 83 processes the documents accordingly before storing them in the Stage Subdirectory 64. Additional rules may be applied, for example, to automatically convert a non-standard file format used within an organization to a standard file format.

Other rules may be administered as needed. For example, additional optimization, compression, or compiling rules may be performed. In any event, steps 112 and 113 in FIG. 11 have no effect on the original versions of the documents being collected. Rather, these steps operate on copies of the original documents.

The reformatted document then is stored in the Stage Subdirectory 64 at its assigned stage address (step 114 in FIG. 11).

Steps 111-114 in FIG. 11 are repeated for each document until no more documents remain to be collected (step 115).

2. Testing

Figure 7:
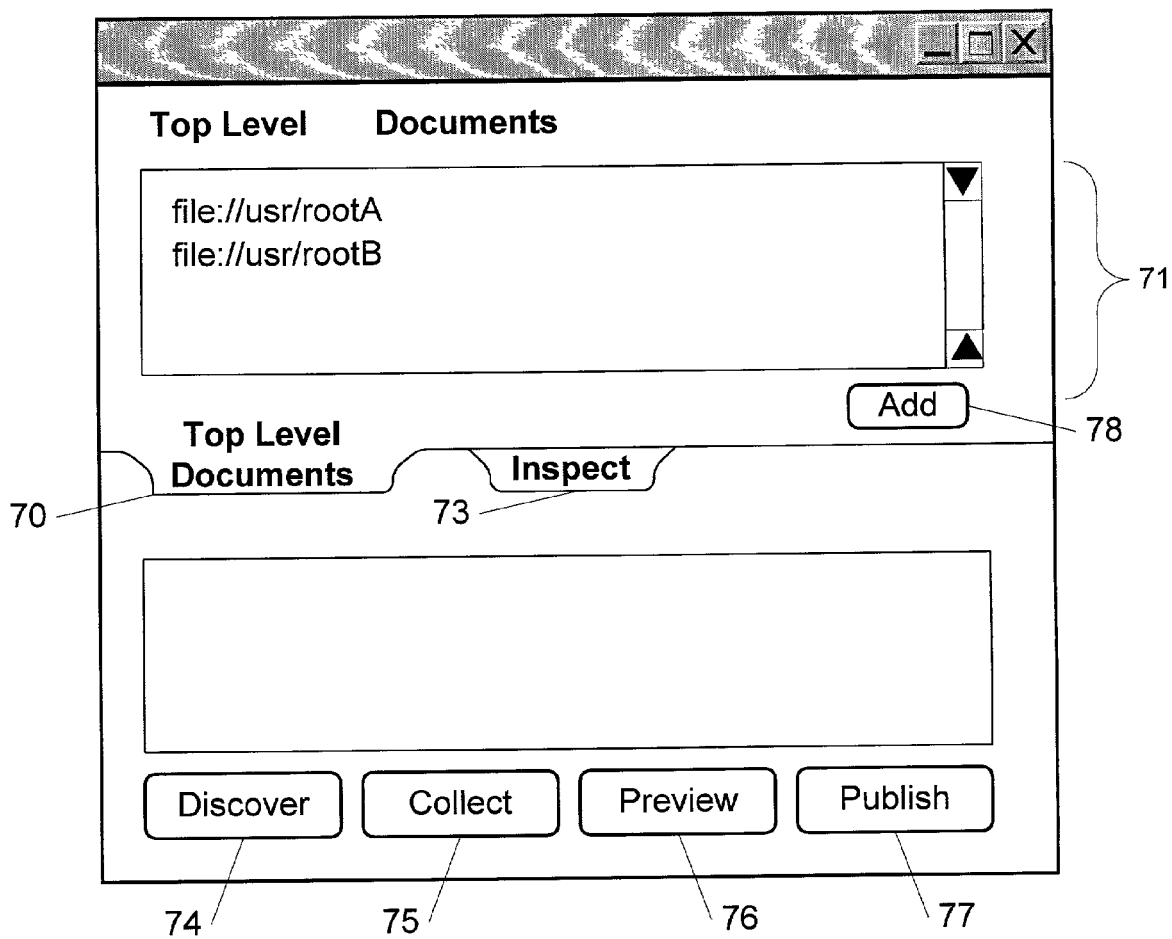
FIG. 7 shows a graphical user interface (GUI) used in publishing a hypermedia document.

When the Collect step 83 is complete, the Package step 51 of FIG. 5 also is complete, and the author optionally can test the packaged documents stored in the Stage Subdirectory 64 (step 52 in FIG. 5). The GUI of FIG. 7 provides two testing mechanisms: an Inspect feature, invoked by selecting the Inspect tab 73, and a Preview feature, invoked by selecting the Preview button 76.

Figure 12:
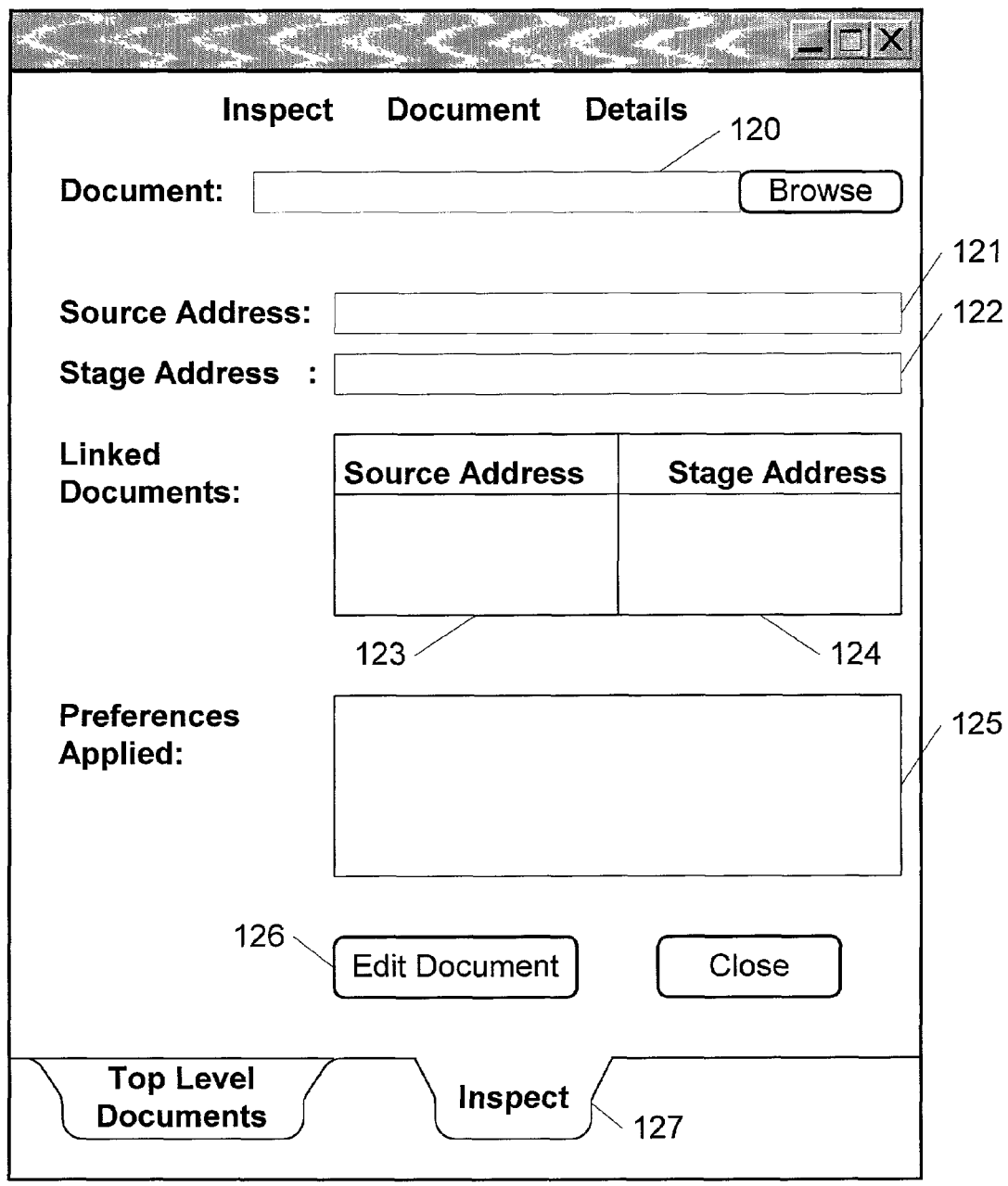
FIG. 12 shows a GUI used in publishing a hypermedia document.

The publishing application may be implemented to allow the Inspect feature to be invoked at various stages during the publishing process, thereby allowing an author to inspect information about the top level of a referenced document at various stages. Selecting the Inspect tab 73 results in a display such as that illustrated in FIG. 12. As shown, the Inspect feature allows the author to specify a document in the document field 120 from the Reference Database 66, and to view information about the selected document. The information available in the Reference Database 66 will vary depending on the stage at which the Inspect feature is invoked. For example, prior to the Discover step 82 in FIG. 8, no information may be available in the Reference Database 66. After the Discover step 82 but prior to the Collect step 83, available information may include a document's source address 121, its stage address 122, and its linked documents 123. After the Collect step 83, additional information in the Reference Database 66 may include the updated addresses for the linked documents 124 and preferences 125 to be applied to the document.

The packaging application may be implemented to allow an author to edit either the format of a document or the document's content or both. For example, as noted above, the remapping phase of the collecting step 83 in FIG. 8 may be implemented to rename a document that maps to a stage address already assigned to a different document. In the example given above, documents file:/usr/images/sun.gif and file:/mydocs/images/sun.gif were mapped respectively to /stage/sun.gif and /stage/sun-2.gif. When inspecting the results of the Packaging step 51 in FIG. 5, an author may rename the document stored at stage address file:/mydocs/images/sun.gif to /stage/eclipse_sun.gif by editing the stage address 122.

If the author wishes to edit the content of the top level document and/or linked documents during or after the Package step 51, editing applications for creating and editing various media types and formats provided by the publishing application allow the author to edit documents from within the publishing application. For example, the Inspect window shown in FIG. 12 may provide an Edit Document option 126 which, when selected, opens the document entered in document field 120 in an appropriate editing environment.

To update the Reference Database 66 and Stage Subdirectory 64 to reflect any edits made to the document, the author may reapply the Discover 82 and Collect 83 steps of FIG. 8 as needed. Each of these processes may be implemented to provide incremental application. Specifically, only those documents affected by an edit are rediscovered, remapped, and/or recollected. This may be implemented, for example, by marking edited or added documents in the Reference Database 66 and providing rules for determining the affected documents, which may include the parent and child documents of the edited or added documents.

The Preview feature allows an author to view a simulation, created from top level and sublevel documents as they are stored in the Stage Subdirectory 64, of published hypermedia documents. Using the simulation, the author may, for example, test links, navigate in VRML worlds created from referenced VRML documents, and test layouts of referenced HTML documents. If the author has access to a browser, remote documents also can be previewed. Moreover, if the author tests the simulation at its intended network server, Trusted References and server-side applications also are available for preview. If a document cannot be previewed, the Preview feature may be implemented to provide an appropriate warning.

3. Distributing

The author completes the publishing step 41 of FIG. 4 for the top level document(s) by distributing the packaged documents to a network server (step 53 of FIG. 5). To do so, the author selects the Publish button 77 in the GUI of FIG. 7. The distribute step 53 may be implemented to copy documents from the Stage Subdirectory 64 to a directory on the network server 62. The storage location in the server directory 62 generally determines the URL address of the top level document. Documents not copied to the Stage Subdirectory 64, such as Trusted References and remote documents, also are not copied to the directory on the network server 62. The specific location of the directory and the URL address may be determined by author input or by a default process. When completed, viewers may access the published top level document at its URL address using a browser.

As part of the distribution step 53 in FIG. 5, a document package can be modified as needed to conform to server-side specifics. For example, if the document package is being distributed to a Windows NT server instead of a UNIX server, the package may have to be reparsed and repackaged to adjust file naming conventions or MIME (Multipurpose Internet Mail Extensions) conventions, which are based on filename suffixes.

Figure 13:
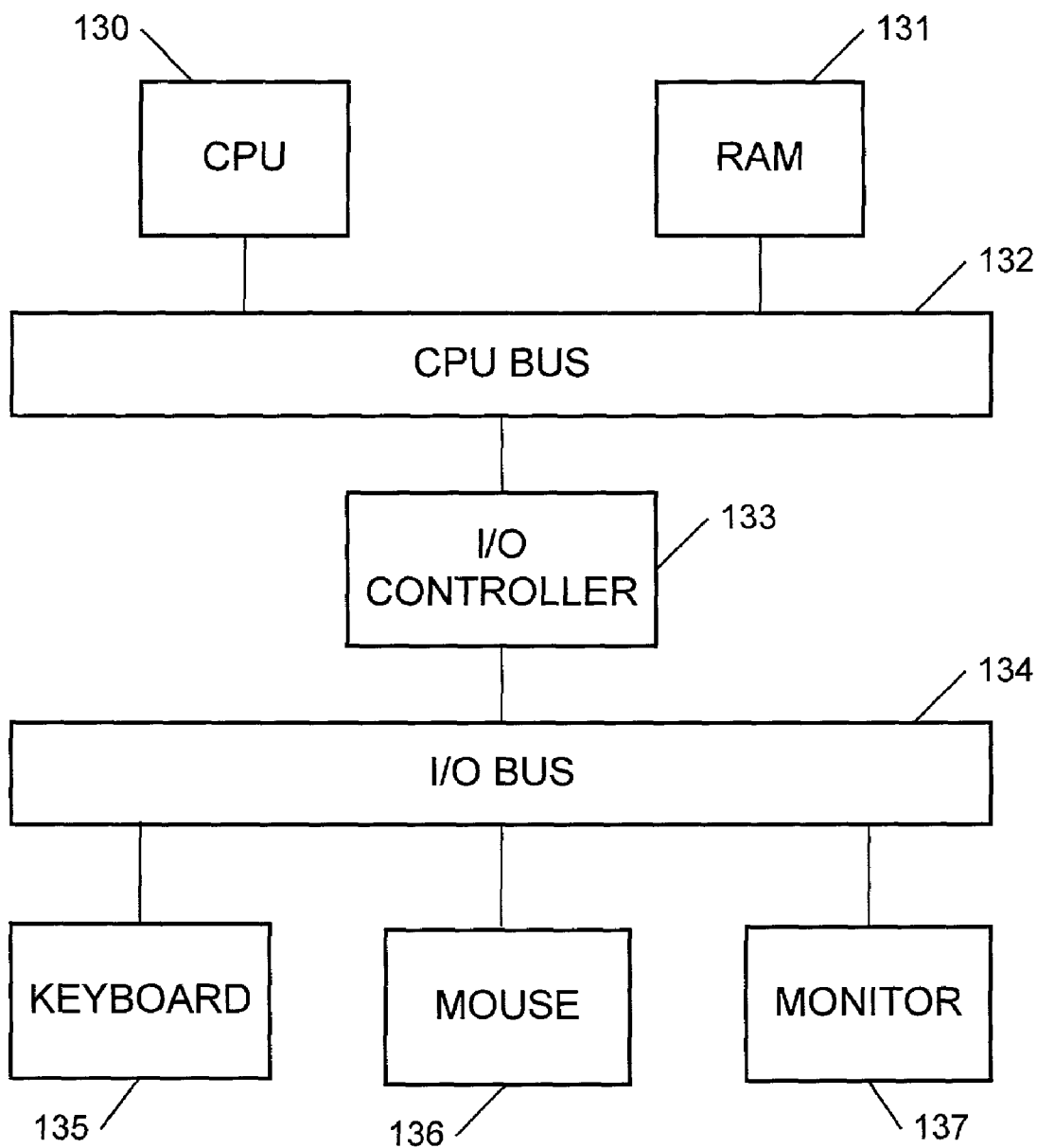
FIG. 13 shows a computer system.

The above methods and techniques may be implemented in digital hardware or computer software, or a combination of both. Preferably, they may be implemented in a computer program executing in a computer system. Such a computer system may include a processor, a data storage system, at least one input device, and an output device. FIG. 13 illustrates one such computer system, including a CPU 130, RAM 131, and an I/O controller 133 coupled by a CPU bus 132. The I/O controller 133 also is coupled by an I/O bus 134 to input devices such as a keyboard 135 and a mouse 136, and output devices such as a monitor 137.

Several variations of the described embodiment are possible. For example, the above methods and techniques may be implemented to perform each of the steps in separate passes of the top level and sublevel linked documents, or may perform multiple steps in each of multiple passes or in a single pass of the documents.

Criteria may be provided to enable the invention to determine automatically whether to store the documents in the Stage Subdirectory 64 in a flat or a hierarchical organization.

The Package Directory 63 created by the publishing application optionally may include a Source Subdirectory 67 for storing copies of the documents to be stored in the Stage Subdirectory 64 as they existed at their source address when the Discover step 82 of FIG. 8 was invoked. If the Source Subdirectory 67 is used, the Discover step 82 copies the top level document into the Source Subdirectory 67 as part of step 100 in FIG. 10, and copies the linked documents into the Source Subdirectory 67 as part of step 106 in FIG. 10. The Collect step 83 of FIG. 8 then retrieves documents in step 111 in FIG. 11 from the Source Subdirectory 67 rather than retrieving the documents from their source addresses. The Source Subdirectory 67 may be used, for example, for keeping a record of the state of the source documents or for keeping a copy of a source document in the format it had at the time it was packaged. The address or content of the source document may be altered after the document is packaged, and retaining a copy of the packaged version in the Source Subdirectory 67 preserves the document for later editing or viewing.

Caching copies in the Source Subdirectory 67 in this manner also could allow a user to continue working on the original document in the event that the collection step 83 in FIG. 8 takes an excessively long time, such as often occurs when a large number of files need to be collected or when one or more of the documents requires a significant amount of processing (e.g., converting a movie file from one format to another).

Various applications or combinations of applications may be provided to work in conjunction with the publishing application. For example, conversion applications, optimization applications, parsing applications, editing applications and the like may be provided and updated as needed.

The Reference Database 66 may be implemented to store various types of information. Additionally, if desired, the Reference Database 66 and the Preference Database 65 may be stored as a single database.

Additional link verification steps may be provided in the Discover step 82 in FIG. 8. For example, while a publishing application may be configured to prevent discovery of links in a remote document, the application may verify that the document does exist at the link address.

Other embodiments are within the scope of the following claims.

What is claimed is:

1. A computer-implemented method for preparing hypermedia documents for publishing, the method comprising:
   generating an unpublished hypermedia document at a computer system in a non-web-publishable format;
   recursively parsing the unpublished hypermedia document to identify at least one direct linked document and at least one nested linked document;
   remapping addresses for the unpublished hypermedia document, the direct linked document and the nested linked document, wherein cross-references between the unpublished hypermedia document, the direct linked document and the nested linked document are represented with relative remapped addresses;
   converting at least a version of the unpublished hypermedia document from the non-web-publishable format to a web-publishable format at the computer system;
   storing a package of documents comprising the version of the unpublished hypermedia document, versions of the direct linked document, and the nested linked document in a directory at their remapped addresses, wherein storing the versions of the documents comprises storing the versions in a hierarchical organization within the directory; and
   transmitting the package of documents from the computer system to a web server to publish the unpublished hypermedia document to the World Wide Web.

2. The method of claim 1 wherein the recursive parsing comprises first parsing the unpublished hypermedia document to identify the direct linked document and then parsing the direct linked document to identify the nested linked document.

3. The method of claim 1 wherein the remapping of addresses comprises determining addresses for the unpublished hypermedia document, the direct linked document and the nested linked document.

4. The method of claim 1 wherein the recursive parsing terminates when a termination criterion is met.

5. The method of claim 4 comprising determining that the termination criterion is met when the identified linked document is publicly maintained.

6. The method of claim 4 comprising determining that the termination criterion is met when the identified linked document has been identified as a trusted reference.

7. The method of claim 4 comprising determining that the termination criterion is met when the identified linked document is an element of a set of documents not to be stored in the directory.

8. The method of claim 1 further comprising determining, for each identified document, whether the version of the document is to be stored in the directory.

9. The method of claim 1 wherein storing the versions of the documents comprises storing the versions in a flat organization within the directory.

10. The method of claim 1 further comprising determining a predefined set of preferences; and storing the versions of the documents in accordance with the determined preferences.

11. The method of claim 10 wherein the set of preferences are determined based on user input.

12. The method of claim 10 wherein the set of preferences includes a preference describing an organizational structure with which the versions of the unpublished hypermedia document and linked documents are to be stored in the directory.

13. The method of claim 12 wherein the preference describing the organizational structure determines whether the versions will be stored in the directory in a hierarchical organization or in a flat organization.

14. The method of claim 12 wherein the preference describing the organizational structure comprises a mapping that defines storage addresses in the directory for the versions of at least one of the unpublished hypermedia document and the linked documents.

15. The method of claim 10 wherein the set of preferences includes a preference describing filenames of the versions of the unpublished hypermedia document and linked documents stored in the directory.

16. The method of claim 10 wherein the set of preferences includes a preference for designating a document as a trusted reference.

17. The method of claim 10 wherein the set of preferences includes a preference for defining a set of one or more documents not to be stored in the directory.

18. The method of claim 10 wherein the set of preferences includes a preference for reformatting documents for which versions are stored in the directory.

19. The method of claim 10 wherein the set of preferences includes a preference for converting a document from one format to a different format.

20. The method of claim 10 wherein the set of preferences includes a preference for optimizing a document.

21. The method of claim 10 wherein the set of preferences includes a preference for compressing a document.

22. The method of claim 10 wherein the set of preferences includes a preference for compiling a document.

23. The method of claim 10 wherein the set of preferences includes a preference for reducing an amount of data in a document.

24. The method of claim 10 wherein the set of preferences includes a preference for adding intellectual property protection to a document.

25. The method of claim 24 wherein adding intellectual property protection to a document comprises inserting a digital watermark in a document.

26. The method of claim 1 further comprising identifying a document that is to be excluded from the remapping and storing.

27. The method of claim 1 further comprising testing the versions of the documents stored in the directory.

28. The method of claim 1 further comprising simulating a server environment; and previewing the versions of the documents stored in the directory on the simulated server environment.

29. The method of claim 1 further comprising distributing the versions of the documents stored in the directory to a server on a network.

30. The method of claim 1 further comprising selectively replacing a version of one of the documents stored in the directory with an edited version of the one of the documents.

31. The method of claim 30 wherein the selective replacing comprises repeating the remapping and the storing for the edited version of the one of the documents.

32. The method of claim 30 wherein the versions of unedited documents are not affected by the selective replacing.

33. The method of claim 1 further comprising:
 editing a document after a version of the document has been stored in the directory; and
 updating the version of the edited document stored in the directory.

34. The method of claim 33 further comprising repeating the editing and the updating an arbitrary number of times.

35. The method of claim 1 further comprising:
 parsing a plurality of unpublished hypermedia documents to identify linked documents; and
 storing versions of the plurality of unpublished hypermedia documents and linked documents in the directory.

36. The method of claim i wherein the parsing, remapping, and storing are completed in a single pass through the unpublished hypermedia document and the linked documents.

37. The method of claim 1 wherein the parsing, remapping, and storing are performed in multiple passes through the unpublished hypermedia document and the linked documents.

* * * * *